United States Patent
Lin et al.

(10) Patent No.: US 12,196,540 B2
(45) Date of Patent: Jan. 14, 2025

(54) METHOD FOR MEASURING THE DIAMETER OF FILAMENT DIFFRACTION FRINGES BY CALCULATING THE FREQUENCY DOMAIN

(71) Applicant: ZHEJIANG UNIVERSITY OF TECHNOLOGY, Zhejiang (CN)

(72) Inventors: Qiang Lin, Zhejiang (CN); Bin Wu, Zhejiang (CN); Zhenghui Hu, Zhejiang (CN); Yingpeng Zhao, Zhejiang (CN); Dianrong Li, Zhejiang (CN); Can Zhang, Zhejiang (CN); Liuxian Ye, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 120 days.

(21) Appl. No.: 17/942,680

(22) Filed: Sep. 12, 2022

(65) Prior Publication Data

US 2023/0366674 A1    Nov. 16, 2023

(30) Foreign Application Priority Data

May 13, 2022   (CN) .......................... 202210522420.0

(51) Int. Cl.
*G01B 11/08*    (2006.01)
*G01B 9/02*     (2022.01)
(Continued)

(52) U.S. Cl.
CPC .......... *G01B 11/08* (2013.01); *G01B 9/02084* (2013.01); *G01N 23/2055* (2013.01); *G01N 2223/0566* (2013.01); *G02B 27/4266* (2013.01)

(58) Field of Classification Search
CPC .. G01B 11/08; G01B 9/02084; G01B 11/105; G06T 7/00; G06T 2207/20056;
(Continued)

(56) References Cited

FOREIGN PATENT DOCUMENTS

CN       105890529 A  *  8/2016  ............. G01B 11/08

OTHER PUBLICATIONS

Pritchett & Trubatch, Aug. 2004, Am. J. Phys., vol. 72, No. 8, pp. 1026-1034 (Year: 2004).*

* cited by examiner

*Primary Examiner* — Michelle M Iacoletti
*Assistant Examiner* — Judy Dao Tran
(74) *Attorney, Agent, or Firm* — MUNCY, GEISSLER, OLDS & LOWE, P.C.

(57) ABSTRACT

A method for measuring the diameter of filament diffraction fringes by frequency domain calculation comprising: building a set of diffraction optical path measurement system and capturing diffraction fringe images; determining the starting point of the imaging range; Simulating the electromagnetic field propagation process in Fraunhofer diffraction, and determining the optimal fringe range considering the noise caused by the difference in CCD sensitivity; Finally calculating the filament diameter by Fourier transform for different lengths of fringe. The final value of the calculated filament diameter is obtained by fitting an envelope to the variation of the diameter. The invention is simple in calculation and has little dependence on the experimental device, which means the superiority of using the frequency domain for parameter measurement, and the measurement accuracy is in the sub-nanometer level. In addition, the invention proves the feasibility of extracting the fringe period information in the frequency domain.

1 Claim, 4 Drawing Sheets

(51) Int. Cl.
*G01N 23/2055* (2018.01)
*G02B 27/42* (2006.01)

(58) Field of Classification Search
CPC ............ G06T 2207/30108; G06T 7/62; G01N 23/2055; G01N 2223/0566; G02B 27/4266
See application file for complete search history.

METHOD FOR MEASURING THE DIAMETER OF FILAMENT DIFFRACTION FRINGES BY CALCULATING THE FREQUENCY DOMAIN

TECHNICAL FIELD

The invention relates to a method for measuring the diameter of diffraction fringes of filaments.

BACKGROUND OF THE INVENTION

The diameter measurement of small objects is divided into contact measurement and non-contact measurement. The non-contact measurement can be measured by the method of optical system diffraction, and the diffraction fringes of the filament can be described in the spatial frequency domain by Fourier transform. However, the main factor affecting the measurement accuracy is the number and periodicity of the diffraction fringes.

Laser diffraction based on the Fraunhofer principle has been widely used to precisely measure the diameter of small objects. Laser diffraction is simpler than electron microscopes and mechanical scanning probes, and it uses non-contact measurement, which can greatly improve measurement accuracy.

Theoretically, diffraction fringes can be described in the spatial frequency domain by Fourier transform, but the fundamental characteristics of the fringes (period length) remain in the frequency domain. The filament diameter is calculated from the periodic length information of the fringes in the frequency domain based on a simple Fraunhofer diffractometer. Therefore, in the actual measurement process, the number of fringe periods and periodicity are the most critical factors that determine the measurement accuracy. Furthermore, the amount and statistical properties of the noise are quite different between the fringes of each order. Since the length of the period varies with the fringe length, higher-order fringes suffer from aperiodicity. At the same time, CCD cameras cause strong light intensity noise. Therefore, improved algorithms with theoretical and experimental basis are needed to solve the above problems, thereby improving the measurement accuracy of filaments.

SUMMARY OF THE INVENTION

The present invention aims to overcome the above shortcomings of the prior art, and provides a method for measuring the diameter of filament diffraction fringes by calculating the frequency domain.

The invention relates to a method of repeatedly scaling and splicing local fringes, which solves the problems of few fringes periods and non-periodicity of high-order fringes. The errors due to high-order and low-order fringes in the measurement are analyzed in detail and solutions are proposed. At the same time, the present invention simulates the diffraction experiment of the filament, and compares the diameter of the filament processed with pseudo-fringes with the diameter of the filament not processed with pseudo-fringes, the relative error is less than 0.2 μm, which proves that the fringe processing method of the present invention is reliable.

Figure 1:
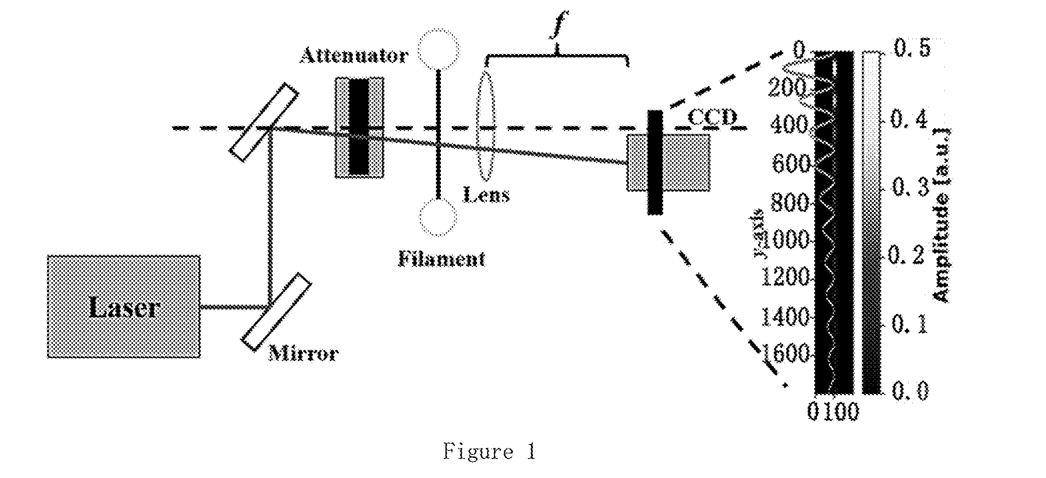
FIG. 1 is an optical path diagram (top view) of the system measuring the diameter of filament diffraction of the present invention.
Figure 2:
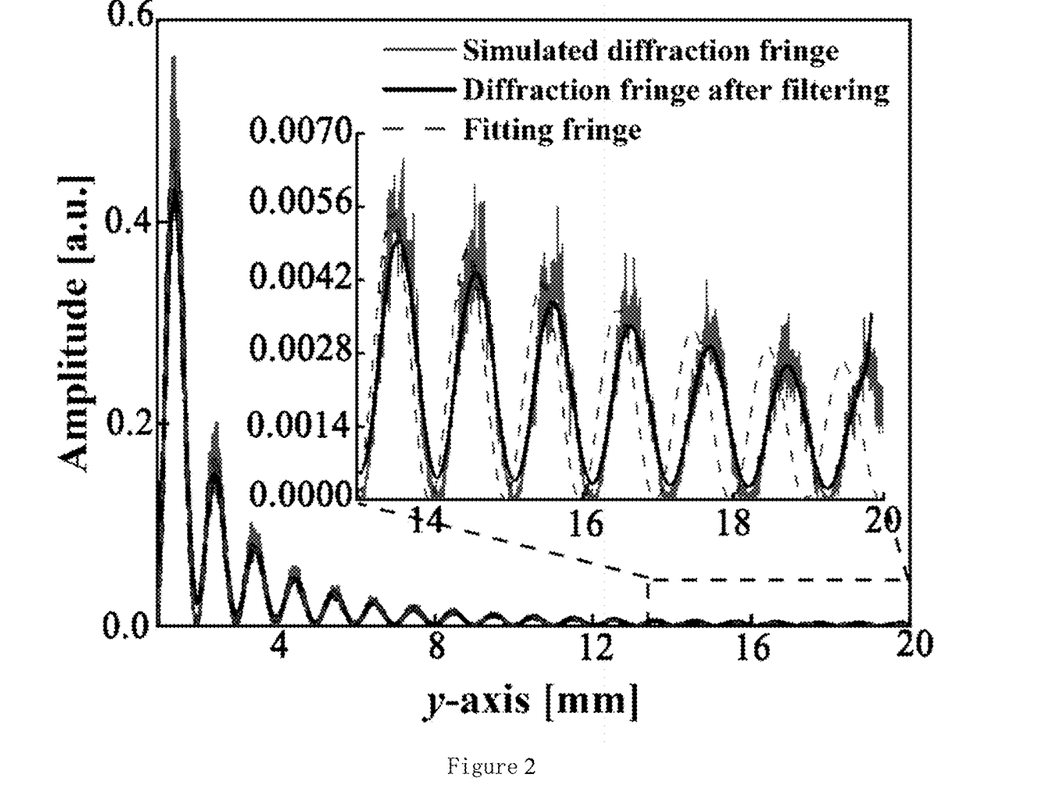
FIG. 2 is the error between the actual diffraction fringe and the theoretical fringe.

A method for measuring the diameter of filament diffraction fringes by frequency domain calculation of the present invention adopts the following technical solutions:

1. Building the Optical Path System Required for Diffraction Measurement;

The experimental part of the present invention is based on a Fraunhofer diffraction device, and the algorithm has a low dependence on the device, and high-precision measurement can be achieved through the processing of the algorithm. The specific optical path diagram is shown in FIG. 1. The laser emitted by the laser passes through two mirrors and an optical power attenuator. The laser is vertically incident on the filament to be measured and diffracted. The diffraction fringes are converged by a convex lens to a CCD at its focal point to obtain the diffraction fringe images where the CCD is connected to a computer and a program is used to capture the fringes. It should be noted that the center of the two mirrors, the center of the optical power attenuator, the center of the filament, and the center of the convex lens should be strictly on the same optical axis, while the CCD needs to deviate from the optical axis to avoid damage to the CCD due to excessive light convergence energy.

2. Deriving the Calculation and Error of Diffractive Filament Diameter;

Since there are many approximations in the calculation of the filament diameter in the frequency domain, in order to further improve the accuracy, the error in the filament process is theoretically analyzed. When uniformly illuminated by a plane wave, the filament resembles an infinitely long slit, and the field source distribution at the filament is $E(Y', 0) = A_0$ ($Y' \leq \pm b/2$, where b is the diameter of the filament and Y' is the distance at the filament in the direction perpendicular to the direction of the light). When the Fraunhofer diffraction approximation condition is satisfied, the electric field expression of the light intensity distribution on the observation screen is:

$$E(Y, f) = \frac{\exp[ikf]}{ikf} \exp\left[\frac{ik}{2f}(Y^2)\right] \iint_{plane} d^2 Y' E(Y', 0) \exp[-ikY' \sin\theta_Y], \quad (1)$$

Wherein, $\theta_r$ is the angle between the wave vector direction and the Y direction, f is the focal length of the lens, and the light field intensity distribution can be expressed as:

$$I = EE^* \approx \frac{A_0^2}{\lambda f} \mathrm{sinc}(b \sin\theta_Y / \lambda)^2, \quad (2)$$

If $Y/f \ll 1$, $\sin\theta_r \approx \sin(\arctan(Y/f)) \approx Y/f$, then formula (2) can be written as:

$$I \approx \frac{A_0^2}{\lambda f} \mathrm{sinc}(bY/\lambda f)^2. \quad (3)$$

Wherein $Y = y - y_0$ ($y = y'd$), d is the pixel size of the CCD, Y is the number of pixels along the y-axis on the imaging plane, y is the distance along the y-axis, and $y_0$ is the center position coordinate of the zero-order fringe. The fast Fourier transform of formula (3) is obtained:

$$F\{I\} = \frac{1}{b^2} i e^{-i v y_0} f \lambda ((b - f v \lambda)(\Gamma\left[-1, \frac{i(-b + f v \lambda)(y_{max} - y_0)}{f \lambda}\right] - \quad (4)$$

$$\Gamma\left[-1, i(\frac{b}{f\lambda} - v) y_0\right] + \mathrm{Log}[y_{max} - y_0] -$$

-continued $$Log\left[\frac{i(-b+f\nu\lambda)(y_{max}-y_0)}{f\lambda}\right] - Log[-y_0] + Log\left[i(\frac{b}{f\lambda}-\nu)y_0\right]) -$$

$$2f\lambda\nu(Log[-y_0] - \Gamma[-1, i\nu(y_{max}+y_0)] + \Gamma[-1, -i\nu y_0] -$$

$$Log[y_{max} - y_0] - Log[-i\nu y_0]Log[i\nu(y_{max}-y_0)]) -$$

$$(b+f\lambda\nu)(\Gamma\left[-1, \frac{i(b+f\nu\lambda)(y_{max}-y_0)}{f\lambda}\right] - \Gamma\left[-1, -\frac{i(-b+f\nu\lambda)y_0}{f\lambda}\right] +$$

$$Log[y_{max}-y_0] - Log\left[\frac{i(b+f\nu\lambda)(y_{max}-y_0)}{f\lambda}\right] -$$

$$Log[-y_0] + Log\left[-\frac{i(b+f\nu\lambda)y_0}{f\lambda}\right]))$$

Wherein, v is the spatial frequency extreme point, $y_{max}$ is the maximum fringe value, and is obtained by calculating the extreme value of formula (3):

$$b - f\lambda\nu = 0 \quad (5)$$

Finally, Fourier transform can be performed on the diffraction fringes of the filament, and the extreme point (v) in the frequency domain can be extracted to calculate the diameter of the filament. In order to improve the accuracy of the measurement, it is necessary to perform operations such as shearing, scaling and splicing of the diffraction fringes.

Figure 4A:
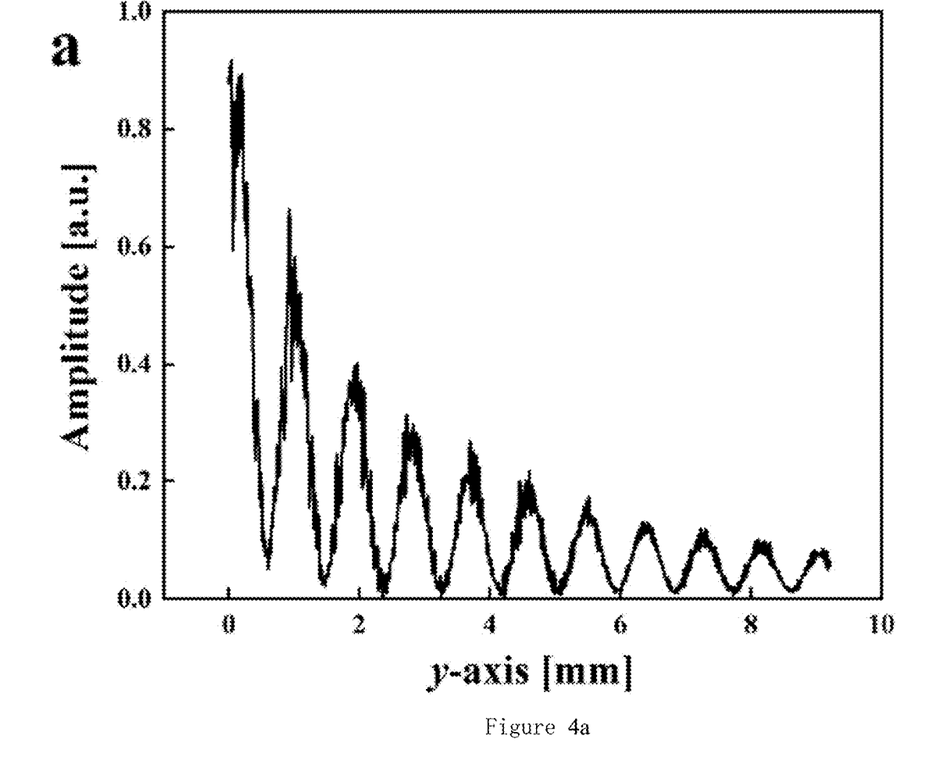
FIG. 4a is the diffraction fringe pattern of a filament with a diameter of x.
Figure 4B:
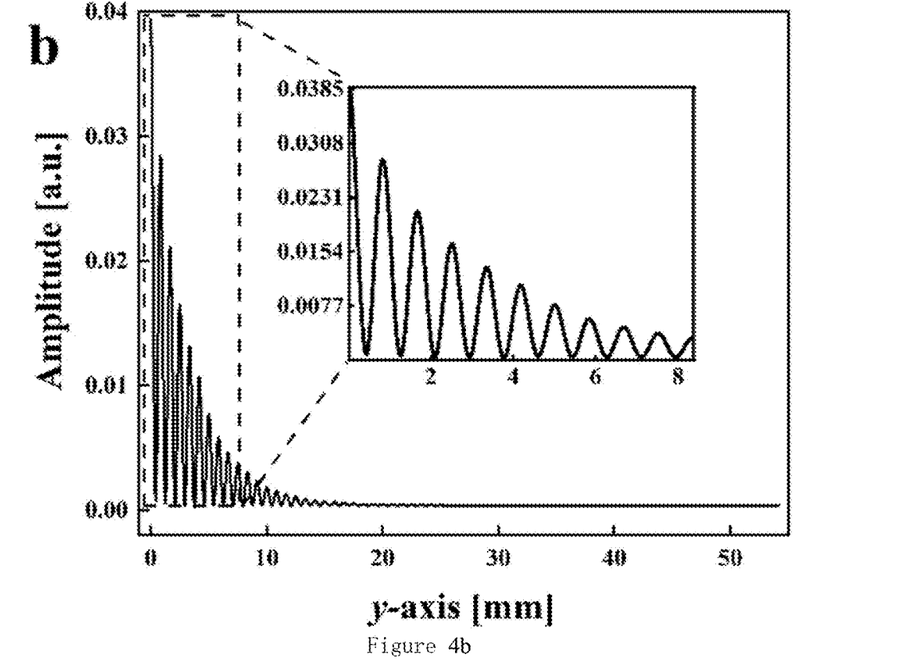
FIG. 4b is the repeated mosaic of pseudo-fringes.

3. Processing Algorithmic;
   (1) Capturing filament diffraction fringe images with CCD;
   (2) Cutting, filtering and preprocessing the images;
   (3) Extracting one-dimensional diffraction fringes from the image, and extracting a better range (refer to Step 4 for details) as local fringes;
   (4) Forming pseudo-stripes by compressing and splicing local stripes (as shown in FIG. 4);
   (5) Obtaining the frequency domain information of the fringes by performing Fourier transform on the pseudo fringes;
   (6) Calculating the filament diameter by continuously extending the fringes, then obtaining the change curve of the filament diameter by continuously extending the fringes (as shown in FIG. 4d);
   (7) Extracting the upper and lower interval limits of the diameter of the filament, and solving the convergence value of the diameter of the filament (that is, the measured value of the diameter of the filament).

4. Measuring the Filament Diffraction;
4.1 Determining the Size Range of Local Fringes;

Because the change of the light intensity extreme value is not a proportional sequence, directly reducing the scale of the local fringes will cause the light intensity of the pseudo fringes to deviate from the light intensity of the actual fringes. FIG. 4a shows the case of local fringes, and the light intensity extreme value ratio of the fringes satisfies:

$$\frac{I_{n+1}}{I_n} = \left(1 - \frac{1}{n-k+\frac{3}{2}}\right)^2, \quad (8)$$

Wherein, $I_n$ is the light intensity extrema of the nth order fringe, and the kth bright fringe is the central bright fringe of the image. As shown in FIG. 4a, when n is large, the intensity of the bright fringes is nearly constant at the extreme value. Therefore, the p-q order bright fringes are used as the starting point of the imaging range.

Figure 3:
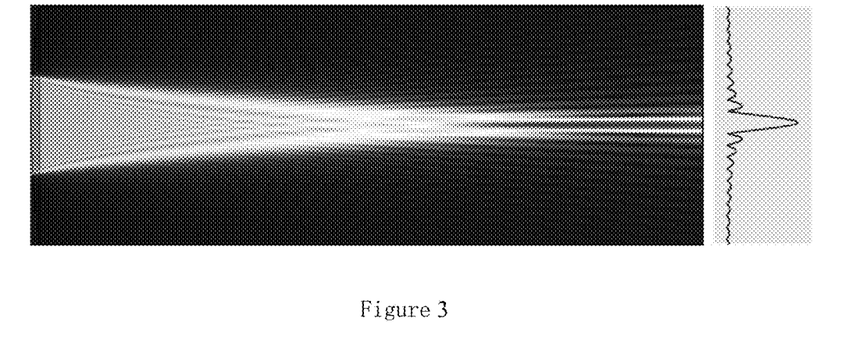
FIG. 3 is the COMSOL simulation diffraction physical process of the present invention.

The diffraction fringes obtained by simulating optical field propagation using COMSOL are shown in FIG. 3. Partial diffraction fringes are used as the basis for repeated stitching. The center bright fringe and the 1st-3rd grade bright fringes are not selected, and the simulated fringes in different ranges are analyzed to obtain the optimal fringe range A<y<B, in order to be generally suitable for filaments of other diameters or lasers of other wavelengths, the scale factor of the fringes is defined as y/λb, and the optimal value range is C<y/λb<D.

4.2 Calculating the Filament Diameter;

Assuming that the diameter of the filament to be measured is x, the focal length of the lens is f, the minimum pixel point of the CCD is a, and the size of the local fringe image is l. FIG. 4a shows the diffraction fringes of a filament of diameter x. The noise is processed using a Butterworth low-pass filter, resulting in a smooth fringe curve. To improve accuracy, the central bright fringe and the first few grades bright fringes are excluded. As shown in FIG. 4b, the cropped pseudo fringes are spliced to the last bright fringes of the segment, and then the operation is repeated to increase the fringes.

Figure 4C:
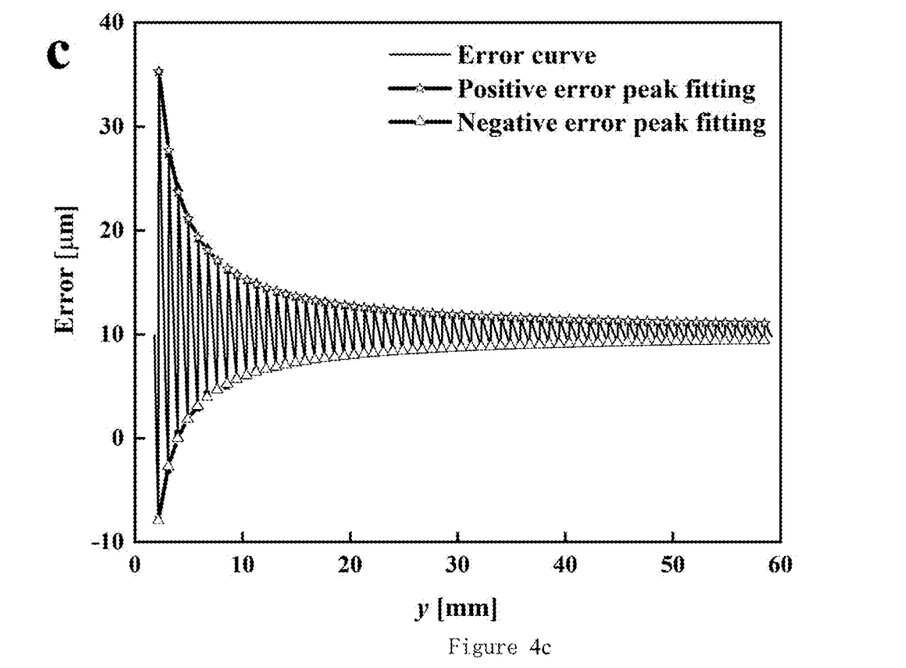
FIG. 4c is the calculated fitting diagram of the filament diameter.
Figure 4D:
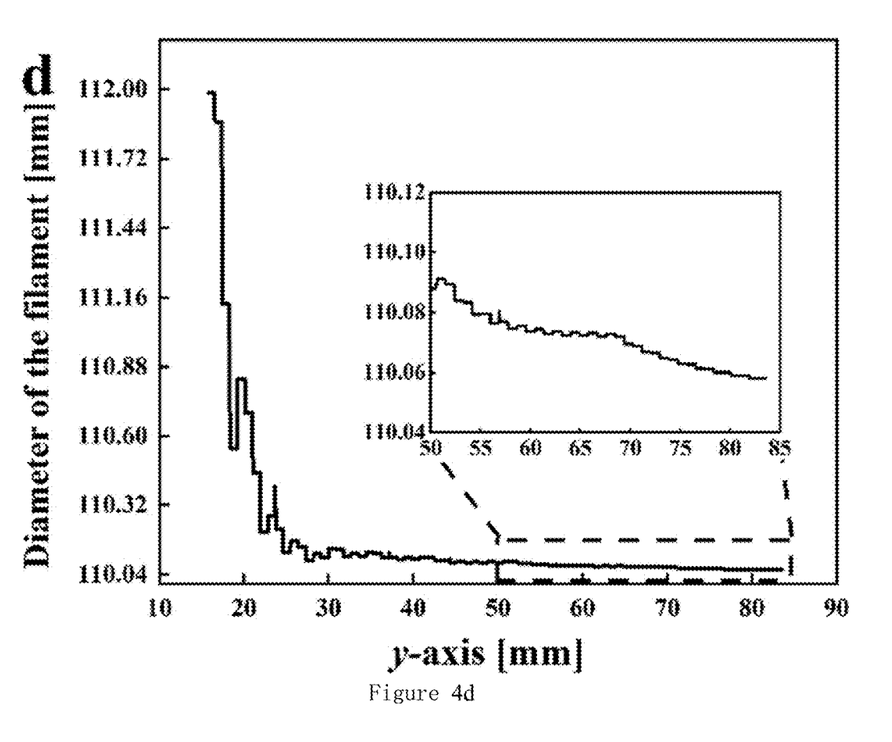
FIG. 4d is the calculated relationship between the diameter of the filament and the length of the fringe.

As shown in FIG. 4c, the filament diameter gradually converges to a tiny interval. Extract the peak (valley) points in the curve, and fit these peak (valley) points respectively to obtain the convergence interval of the diameter. The fitted equation is as follows:

$$Z = k\left(\frac{1}{y-y^*}\right) + C \quad (9)$$

wherein, k, y*, C are the constants of the fitted equation and y is the lengths of the fringes.

As shown in FIG. 4c, the blue and red curves are obtained by fitting, and the filament diameter is calculated as $\tilde{b} = C_{up} + C_{down}$. As shown in FIG. 4d, obtain the relationship between the diameter of the filament and the length of the fringe.

The present invention designs a method of lengthening pseudo-fringes connected by local fringes. Specifically, it involves performing Fourier transform on the diffraction fringes, and then obtaining the optimal range of pseudo fringes through experimental and theoretical analysis methods. This method can greatly improve the accuracy of filament diameter measurement and improve the efficiency of diffraction measurement.

The significant advantage of the present invention is that the calculation is simple, and the dependence on the experimental device is small, which means the superiority of using the frequency domain for parameter measurement, and the measurement accuracy is in the sub-nanometer level. In addition, the present invention proves the feasibility of extracting the fringe period information in the frequency domain, and can be applied to other fields that need to analyze the period information.

DESCRIPTION OF DRAWINGS

FIG. 4a to 4d are the processing results of the diffraction fringe images, wherein

EMBODIMENTS

The technical solutions of the present invention are further described below with reference to the accompanying drawings.

Aiming at the deficiencies in the existing fringe identification processing algorithm, the invention establishes an upgrade of the diffraction fringe algorithm for measuring the diameter of the filament, and realizes the measurement of the diameter of the filament with high precision. The main contents include: build a diffraction optical path measurement system and use CCD to take diffraction fringe images; determine the starting point of the imaging range; use the finite element method and numerical calculation to simulate the electromagnetic field propagation process in Fraunhofer diffraction and determining the optimal fringe range considering the noise caused by the difference in CCD sensitivity; finally, the filament diameter is obtained by fitting the fringes.

A method for measuring the diameter of filament diffraction fringes by calculating the frequency domain, comprising the following steps:

1. Building the Optical Path System Required for Diffraction Measurement;

Since the present invention adopts a Fraunhofer diffraction device, the algorithm has a very low dependence on the device, and high-precision measurement can be achieved through the processing of the algorithm. The specific optical path diagram used in the present invention is shown in FIG. 1. After the laser emitted by the laser passes through two mirrors, the optical power is attenuated, and the laser after passing through the optical power attenuator encounters the filament to produce diffraction phenomenon, and the diffraction pattern is converged by a lens with a focal length of f to a CCD placed in focus, and then the CCD captures the pattern of diffraction fringes. The CCD camera is connected to a computer and the fringes are captured by the program. It should be noted that the center of a mirror, the optical power attenuator, the center of the filament, and the center of the lens should be on the same optical axis, but the CCD camera needs to deviate from the optical axis (to avoid zero-order fringes entering the CCD imaging surface) to prevent light from converging excessive energy damaging the CCD.

2. Deriving the Calculation and Error of Diffractive Filament Diameter;

If the filament is uniformly illuminated by a plane wave, the filament resembles an infinite slit, and the field source distribution at the filament can be $E(Y', 0)=A_0$ ($Y' \leq \pm b/2$, where b is the filament diameter and Y' is the distance at the filament in the Y direction perpendicular to the direction of the light). When the Fraunhofer approximation condition is satisfied, the electric field expression on the viewing screen is:

$$E(Y, f) = \frac{\exp[ikf]}{ikf}\exp\left[\frac{ik}{2f}(Y^2)\right]\iint_{plane} E(Y', 0)\exp[-ikY'\sin\theta_Y]d^2Y', \quad (1)$$

where $\theta_Y$ is the angle between the wave vector direction and Y direction, and f is the focal length of the lens, and the intensity distribution of the light field can be expressed as:

$$I = EE^* \approx \frac{A_0^2}{\lambda f}\text{sinc}(b\sin\theta_Y/\lambda)^2, \quad (2)$$

If $Y/f \ll 1$, $\sin\theta_Y \approx \sin(\arctan(Y/f)) \approx Y/f$, then formula (2) is changed to:

$$I \approx \frac{A_0^2}{\lambda f}\text{sinc}(bY/\lambda f)^2. \quad (3)$$

Wherein, $Y=y-y_0(y=y'd)$, d is the pixel size of the CCD, Y is the number of pixels along the y-axis on the imaging plane, y is the distance along the y-axis, and $y_0$ is the center position coordinate of the zero-order fringe. The fast Fourier transform of formula (3) is obtained:

$$F\{I\} = \frac{1}{b^2}ie^{-iv y_0}f\lambda((b-f v\lambda)(\Gamma\left[-1, \frac{i(-b+f v\lambda)(y_{max}-y_0)}{f\lambda}\right]-\quad (4)$$

$$\Gamma\left[-1, i(\frac{b}{f\lambda}-v)y_0\right] + \text{Log}[y_{max}-y_0] -$$

$$\text{Log}\left[\frac{i(-b+f v\lambda)(y_{max}-y_0)}{f\lambda}\right] - \text{Log}[-y_0] + \text{Log}\left[i(\frac{b}{f\lambda}-v)y_0\right] -$$

$$2f\lambda v(\text{Log}[-y_0] - \Gamma[-1, iv(y_{max}+y_0)] + \Gamma[-1, -iv y_0] -$$

$$\text{Log}[y_{max}-y_0] - \text{Log}[-iv y_0]\text{Log}[iv(y_{max}-y_0)]) -$$

$$(b+f\lambda v)(\Gamma\left[-1, \frac{i(b+f v\lambda)(y_{max}-y_0)}{f\lambda}\right] - \Gamma\left[-1, -\frac{i(-b+f v\lambda)y_0}{f\lambda}\right] +$$

$$\text{Log}[y_{max}-y_0] - \text{Log}\left[\frac{i(b+f v\lambda)(y_{max}-y_0)}{f\lambda}\right] -$$

$$\text{Log}[-y_0] + \text{Log}\left[-\frac{i(b+f v\lambda)y_0}{f\lambda}\right]))$$

Wherein, v is the spatial frequency extreme point, $y_{max}$ is the maximum fringe value, and formula (5) is obtained by calculating the extreme value of formula (3):

$$b-f\lambda v=0 \quad (5)$$

Finally, Fourier transform can be performed on the diffraction fringes of the filament, and the extreme point (v) in the frequency domain can be extracted to calculate the diameter of the filament. In order to improve the accuracy of the measurement, it is necessary to perform operations such as shearing, scaling and splicing of the diffraction fringes.

3. Processing Algorithmic;
   (1) Capturing the filament diffraction fringe images with CCD;
   (2) Cutting, filtering and preprocessing the images;
   (3) Extracting one-dimensional diffraction fringes from the image, and extracting a better range (refer to Step 4 for details) as local fringes;
   (4) Forming pseudo-fringes by compressing and splicing local fringes (as shown in FIG. 4);
   (5) Obtaining the frequency domain information of the fringes by performing Fourier transform on the pseudo fringes;
   (6) Calculating the diameter of the filament, and obtaining the change curve of the diameter of the filament by continuously extending the fringes (as shown in FIG. 4d);

(7) Extracting the upper and lower interval limits of the filament diameter, and solving the diameter convergence value of the filament (that is, the measured value of the diameter of the filament).

4. Measuring the Filament Diffraction;

4.1 Determining the Size Range of Local Fringes;

In order to retain more information of diffraction fringes in the spliced fringes, it is necessary to cut the obtained fringes to obtain local fringes. The size range of the local fringes directly affects the accuracy, and theoretical analysis is required for this. The change of the light intensity extreme value is not a proportional sequence, and directly reducing the scale of the local fringes will cause the light intensity of the false fringes to deviate from the light intensity of the actual fringes. FIG. 4a shows the situation of local fringes, and the light intensity extreme value ratio of the fringes satisfies:

$$\frac{I_{n+1}}{I_n} = \left(1 - \frac{1}{n - k + \frac{3}{2}}\right)^2, \quad (8)$$

wherein $I_n$ is the light intensity extrema of the nth level fringe, and the k th bright fringe is the central bright fringe of the image. As shown in FIG. 4b, when n is large, the intensity of the bright fringes is nearly constant at the extreme value. Therefore, the 5-7th order bright fringes serve as the starting point of the imaging range.

Using finite element method and numerical calculation, the electromagnetic field propagation process in Fraunhofer diffraction is simulated. To make the simulation realistic, a noise term was added, including noise related to light intensity in the fringe analysis. The noise intensity is proportional to the light intensity of the bright fringes, due to differences in the response of the CCD photoreceptors to light. In addition, the noise also includes Gaussian noise and white noise due to the action of the laser spot.

In order to accurately obtain the optimal range of local fringes, the diffraction fringes obtained by simulating the propagation of the light field through the filament using COMSOL are shown in FIG. 3. Filament diameters were calculated by selecting local fringes of different segments as the basis for repeated splicing. The central bright fringes and the 1st-3rd order bright fringes should be omitted from the selection, as shown in Table 1, the simulated fringes in different ranges are analyzed, and the calculated filament diameter results in different fringe ranges are obtained. The optimal local fringe range is 4.969<y<8.307 mm (Assume that the coordinate center is the center of the 0-level bright fringe, and the local fringe range is the 7-12-level bright fringe). Then, to ensure that this range is relevant to measurements at various wavelengths and focal lengths, the optimal scaling factor for the local fringes is 49.69<y/λf<83.07 mm$^{-1}$

TABLE 1

Calculated filament diameters in different fringe ranges

| (mm) Diffraction fringe length (mm) | Scale Factor $y/\lambda f$ (mm$^{-1}$) | Calculated filament diameter (no noise) | Calculated filament diameter (fringe signal-to-noise ratio 15.28) |
| --- | --- | --- | --- |
| 6.08 | 16.30-77.11 | 0.15089 | 0.15107 |
| 5.34 | 23.70-77.11 | 0.15068 | 0.15108 |

TABLE 1-continued

Calculated filament diameters in different fringe ranges

| (mm) Diffraction fringe length (mm) | Scale Factor $y/\lambda f$ (mm$^{-1}$) | Calculated filament diameter (no noise) | Calculated filament diameter (fringe signal-to-noise ratio 15.28) |
| --- | --- | --- | --- |
| 4.65 | 30.59-77.11 | 0.15043 | 0.15054 |
| 3.35 | 43.65-77.11 | 0.15038 | 0.15056 |
| 2.74 | 49.69-77.11 | 0.15014 | 0.15018 |
| 2.00 | 49.69-77.11 | 0.15027 | 0.15062 |
| 3.34 | 49.69-83.07 | 0.15007 | 0.14988 |
| 3.94 | 49.69-83.07 | 0.15055 | 0.15033 |

4.2 Calculating the Specific Filament Diameter;

Measurements are made using filaments with a diameter of 0.11±0.001 mm (filament machining has an accuracy of 1 μm). With a lens focal length of 125 mm and a CCD pixel unit size of 4.8 μm, the size of the local fringe image is 8.64 mm, and the filament diffraction fringes with a diameter of 0.11 mm are shown in FIG. 4a. The noise is processed using a Butterworth low-pass filter, resulting in a smooth fringe curve. In order to improve the accuracy, the diffraction fringes will be cropped, and the optimal size range (49.69<y/λf<83.07) will be selected. As shown in FIG. 4b, the cropped pseudo fringes are spliced to the last bright fringes of the segment, and then the operation is repeated to increase the fringes.

As shown in FIG. 4c, the filament diameter gradually converges to a tiny interval. Extract the peak (valley) points in the curve, and fit these peak (valley) points respectively to obtain the convergence interval of the diameter. The fitted equation is as follows:

$$Z = k\left(\frac{1}{y - y^*}\right) + C \quad (9)$$

where, k, y*, C are the constants of the fitted equation and y is the lengths of the fringes.

As shown in FIG. 4c, the blue and red curves were obtained by fitting, and the filament diameter was calculated as $\tilde{b} = C_{up} + C_{down}$. As shown in FIG. 4d, the relationship between the diameter x' of the obtained filament and the lengthy of the pseudo fringe is obtained. The filament diameter converges to 110.07134 μm and the length of y is 76 mm. In contrast, directly calculating the filament diameter of the original fringe in the frequency domain is 108.62 μm, and using local fringe stitching improves the relative error of the fringe from 0.38 μm to 0.071 μm.

In addition, in order to verify the feasibility of the algorithm, filaments of different diameters will be used to evaluate the feasibility and accuracy of the method. As shown in Table 2, for the actual obtained filament diffraction images, the pixel size has little effect on the accuracy.

TABLE 2

The actual obtained filament diffraction images

Images

| Serial number | 1 | 2 | 3 | 4 | 5 | 6 | 7 | 8 |
|---|---|---|---|---|---|---|---|---|
| Filament diameter (mm) | 0.11 | 0.12 | 0.13 | 0.14 | 0.15 | 0.16 | 0.17 | 0.18 |

Table 3 shows the results of the actual measurement, the lens focal length f=100 mm, and the cut-off spatial frequency of the Butterworth low-pass filter is 0.055 mm$^{-1}$. Comparing the diameter of the filament treated with the pseudo-fringe using the present invention with the diameter of the filament not treated with the pseudo-fringe, the relative error is less than 0.2 μm. The data suggest that measurement accuracy may be significantly improved with the presence of stitched streaks.

TABLE 3

Results of actual measurement

| Serial number | Filament diameter (mm) | Filament diameter without pseudo fringe treatment (mm) | Filament diameter treated with pseudo-fringe (mm) |
|---|---|---|---|
| 1 | 0.11 ± 0.001 | 0.1086 | 0.1098 |
| 2 | 0.12 ± 0.001 | 0.1207 | 0.1200 |
| 3 | 0.13 ± 0.001 | 0.1328 | 0.1295 |
| 4 | 0.14 ± 0.001 | 0.1328 | 0.1393 |
| 5 | 0.15 ± 0.001 | 0.1445 | 0.1499 |
| 6 | 0.16 ± 0.001 | 0.1569 | 0.1605 |
| 7 | 0.17 ± 0.001 | 0.1690 | 0.1698 |
| 8 | 0.18 ± 0.001 | 0.1690 | 0.1807 |

The invention claimed is:

1. A method for measuring a diameter of filament diffraction fringes by calculating the frequency domain, comprising:
   building an optical path system required for a diffraction measurement, said building comprising:
   using a Fraunhofer diffraction device to emit a laser that passes through two mirrors and an optical power attenuator, the laser being vertically incident on a filament to be measured to generate diffraction fringes, the diffraction fringes being converged by a convex lens to a charge coupled device (CCD) at a focal point of the CCD to obtain a diffraction fringe image, where the CCD is connected to a computer to capture the diffraction fringes by programs wherein a center of the two mirrors, a center of the optical power attenuator, a center of the filament, and a center of the convex lens lie on a same optical axis, while the CCD is deviated from the optical axis to avoid damage to the CCD due to excessive light converging energy;
   deriving a calculation and an error of a diffractive filament diameter, said deriving comprising:
   theoretically analyzing an error in said diffraction, wherein the filament is irradiated uniformly by a plane wave and a field source distribution at the filament is E(Y', 0)=A$_0$, where Y'≤±b/2, and b is a diameter of the filament, and Y' is a distance at the filament in a direction perpendicular to a direction of light, and wherein when a Fraunhofer diffraction approximation condition is satisfied, an expression of the electric field of a light intensity distribution on an observation screen is:

$$E(Y, f) = \frac{\exp[ikf]}{ikf}\exp\left[\frac{ik}{2f}(Y^2)\right]\int\int_{plane} E(Y', 0)\exp[-ikY'\sin\theta_Y]d^2Y', \quad (1)$$

wherein, $\theta_Y$ is an angle between a direction of a wave vector and a Y direction, k is a wave vector of the laser, Y' is the distance in the direction of the filament diameter, and f is a focal length of the convex lens, and an intensity distribution of a light field is expressed as:

$$I = EE^* \approx \frac{A_0^2}{\lambda f}\text{sinc}(b\sin\theta_Y/\lambda)^2, \quad (2)$$

If Y/f<<1, sin $\theta_Y$≈sin(arctan(Y/f))≈Y/f, then formula (2) is:

$$I \approx \frac{A_0^2}{\lambda f}\text{sinc}(bY/\lambda f)^2. \quad (3)$$

wherein Y=y−y$_0$(y=y'd), d is a pixel size of the CCD, and Y is a number of pixels along a y axis on the imaging plane, y' is the pixel point distance of the diffraction fringe on the CCD, and y is a distance along the y axis, and y$_0$ is a center position coordinate of the zero-order fringe; formula (4) is obtained by a fast Fourier transform of formula (3):

$$F\{I\} = \frac{1}{b^2}ie^{-ivy_0}f\lambda((b-fv\lambda)(\Gamma\left[-1, \frac{i(-b+fv\lambda)(y_{max}-y_0)}{f\lambda}\right] - \quad (4)$$

$$\Gamma\left[-1, i(\frac{b}{f\lambda}-v)y_0\right] + \text{Log}[y_{max}-y_0] -$$

$$\text{Log}\left[\frac{i(-b+fv\lambda)(y_{max}-y_0)}{f\lambda}\right] - \text{Log}[-y_0] + \text{Log}\left[i(\frac{b}{f\lambda}-v)y_0\right]) -$$

$$2f\lambda v(\text{Log}[-y_0] - \Gamma[-1, iv(y_{max}+y_0)] + \Gamma[-1, -ivy_0] -$$

$$\text{Log}[y_{max}-y_0] - \text{Log}[-ivy_0]\text{Log}[iv(y_{max}-y_0)]) -$$

$$(b+f\lambda v)(\Gamma\left[-1, \frac{i(b+fv\lambda)(y_{max}-y_0)}{f\lambda}\right] - \Gamma\left[-1, -\frac{i(-b+fv\lambda)y_0}{f\lambda}\right] +$$

$$\text{Log}[y_{max}-y_0] - \text{Log}\left[\frac{i(b+fv\lambda)(y_{max}-y_0)}{f\lambda}\right] -$$

$$\text{Log}[-y_0] + \text{Log}\left[-\frac{i(b+fv\lambda)y_0}{f\lambda}\right]))$$

wherein v is a spatial frequency extreme point, y$_{max}$ is a maximum fringe value, and formula (5) is obtained by calculating an extreme value of formula (3):

$$b - f\lambda v = 0 \quad (5);$$

performing a Fourier transform on the diffraction fringes of the filament, and the extreme value point (v) in the frequency domain is extracted to solve the diameter of the filament; and shearing, scaling and splicing the diffraction fringes;
performing an algorithmic processing, comprising:
- capturing filament diffraction fringe images with the CCD;
- cutting, filtering and preprocessing the filament diffraction fringe images:
- extracting one-dimensional diffraction fringes from the filament diffraction fringe images, and extracting a size range of local diffraction fringes;
- forming pseudo-fringes by compressing and splicing the local diffraction fringes;
- obtaining frequency domain information of the diffraction fringes by performing a Fourier transform on the pseudo-fringes;
- calculating the diameter of the filament, and obtaining a change curve of the diameter of the filament by continuously extending the diffraction fringes; and
- extracting an upper interval limit and a lower interval limit of the filament diameter, and solving a diameter convergence value of the filament; and measuring the filament diffraction, comprising:
- determining the size range of local diffraction fringes;
  - directly reducing a proportion of the local diffraction fringes causes the light intensity of the pseudo-fringes deviating from a light intensity of the diffraction fringes; a light intensity extreme value ratio of the diffraction fringes satisfies formula (8):

$$\frac{I_{n+1}}{I_n} = \left(1 - \frac{1}{n-k+\frac{3}{2}}\right)^2, \tag{8}$$

wherein $I_n$ is an extreme value of a light intensity of nth order fringes, and a kth bright fringe is a central bright fringe of the image; and obtaining diffraction fringes by simulating light field propagation using COMSOL, wherein some of the diffraction fringes are used as a basis for repeated splicing, and the central bright fringe and 1st-3rd order bright fringes are not selected, and simulated fringes in different ranges are analyzed to obtain an optimal fringe range A<y<B, a scale factor of the simulated fringes is defined as y/λb, and an optimal value range is: C<y/λb<D, where A is a position of the two fringes at a fourth level of the diffraction stripe, and B is a position of the bright stripe at an eleventh level, C is denoted as equal to A/λb, and D is denoted as equal to B/λb; and calculating the filament diameter, said calculating comprising:
- using Butterworth low-pass filtering to process noise to obtain a smooth fringe curve, wherein the diameter of the filament to be measured is x, the focal length of the lens is f, a minimum pixel point of the CCD is d, and a size of a local fringe image is l;
- excluding the bright fringes in the center and the bright fringes of the $1^{st}$-$3^{rd}$ order;
- splicing cropped pseudo fringes to the last bright fringes of a segment; and
- then repeating said using, said excluding and said splicing of the cropped pseudo fringes, wherein a diameter of the filament gradually converges to an interval; a peak point and a valley point in the smooth fringe curve are extracted, and the peak point and the valley point are fitted respectively to obtain the convergence interval of the diameter; a fitting equation is as follows:

$$Z = k(\frac{1}{y-y^*}) + C \tag{9}$$

wherein, k, y*, C are constants of the fitting equation, and y is the lengths of the fringes, and
wherein a positive error peak fitting and a negative error peak fitting curve are obtained by fitting, and the diameter of the filament is calculated as $\bar{b}=C_{up}+C_{down}$, to obtain a relationship between the diameter of the filament and a length of the fringe wherein $C_{up}$ is the positive error peak fitting curve and $C_{down}$ is the negative error peak fitting curve.

* * * * *